(12) United States Patent
Han et al.

(10) Patent No.: US 8,704,640 B2
(45) Date of Patent: Apr. 22, 2014

(54) PASSIVE WIRELESS MEMORY DEVICE

(75) Inventors: Youngsun Han, Suwon-si (KR); Iljong Song, Yongin-si (KR); Jihun Koo, Hwaseong-si (KR); Seonwook Kim, Seoul (KR); Joongoo Lee, Seoul (KR); Seokjoong Hwang, Seoul (KR); Yeoul Na, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 299 days.

(21) Appl. No.: 13/025,571

(22) Filed: Feb. 11, 2011

(65) Prior Publication Data

US 2011/0199186 A1     Aug. 18, 2011

(30) Foreign Application Priority Data

Feb. 18, 2010   (KR) .................. 10-2010-0014750

(51) Int. Cl.
*H04L 12/403* (2006.01)
*H04J 3/22* (2006.01)
*H04Q 5/22* (2006.01)

(52) U.S. Cl.
USPC ........ 340/10.1; 340/10.4; 340/10.5; 370/450; 370/465; 370/470

(58) Field of Classification Search
USPC ........ 340/10.1, 10.4, 10.5; 370/450, 465, 470
See application file for complete search history.

(56) References Cited

U.S. PATENT DOCUMENTS

| | | | |
|---|---|---|---|
| 5,307,351 A * | 4/1994 | Webster | 370/470 |
| 5,819,182 A * | 10/1998 | Gardner et al. | 455/524 |
| 6,041,057 A * | 3/2000 | Stone | 370/397 |
| 6,256,478 B1 | 7/2001 | Allen et al. | |
| 6,539,205 B1 * | 3/2003 | Wan et al. | 370/465 |
| 6,563,417 B1 | 5/2003 | Shaw | |
| 6,937,573 B2 * | 8/2005 | Chan et al. | 370/252 |
| 7,024,222 B2 * | 4/2006 | Gorsuch | 455/553.1 |
| 7,095,719 B1 * | 8/2006 | Wilhelmsson et al. | 370/252 |
| 7,106,711 B2 * | 9/2006 | Otting et al. | 370/331 |
| 7,965,738 B2 * | 6/2011 | So et al. | 370/470 |
| 7,984,177 B2 * | 7/2011 | Girardeau et al. | 709/231 |
| 8,085,131 B2 * | 12/2011 | Park et al. | 340/10.2 |
| 2003/0220711 A1 * | 11/2003 | Allen | 700/215 |
| 2004/0218630 A1 * | 11/2004 | An | 370/470 |
| 2005/0268181 A1 * | 12/2005 | Murty et al. | 714/704 |
| 2006/0023670 A1 * | 2/2006 | Kim et al. | 370/337 |
| 2006/0038659 A1 * | 2/2006 | Takano et al. | 340/10.51 |
| 2007/0195820 A1 * | 8/2007 | So et al. | 370/470 |
| 2008/0180249 A1 * | 7/2008 | Butler et al. | 340/572.1 |

FOREIGN PATENT DOCUMENTS

| | | |
|---|---|---|
| JP | 2008-234264 | 10/2008 |
| JP | 2008-234265 | 10/2008 |
| KR | 1020080028142 | 3/2008 |
| KR | 1020080098267 | 11/2008 |
| KR | 1020090052215 | 5/2009 |
| KR | 1020090093620 | 9/2009 |

* cited by examiner

*Primary Examiner* — Steven Lim
*Assistant Examiner* — Muhammad Adnan
(74) *Attorney, Agent, or Firm* — Stanzione & Kim, LLP

(57) ABSTRACT

A passive wireless memory device includes a memory unit and a passive tag. The passive tag converts data stored in the memory unit into a data packet in response to first to third data request signals from a reader and transmits the data packet to the reader. The passive tag determines the size of the data packet in response to the channel state predicting flag and the second and third data request signals.

19 Claims, 8 Drawing Sheets

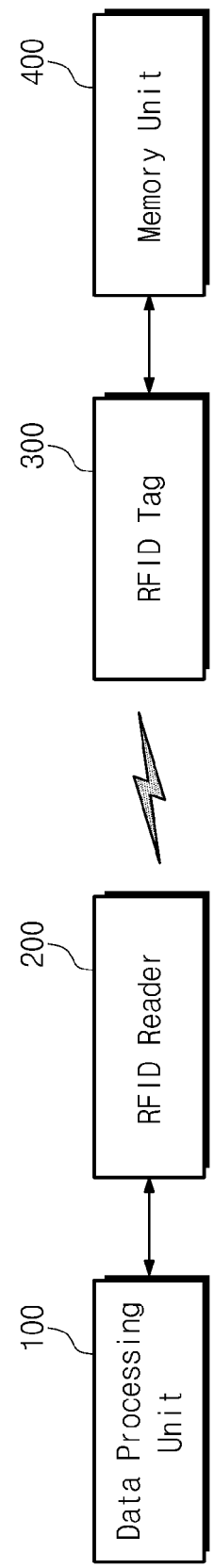

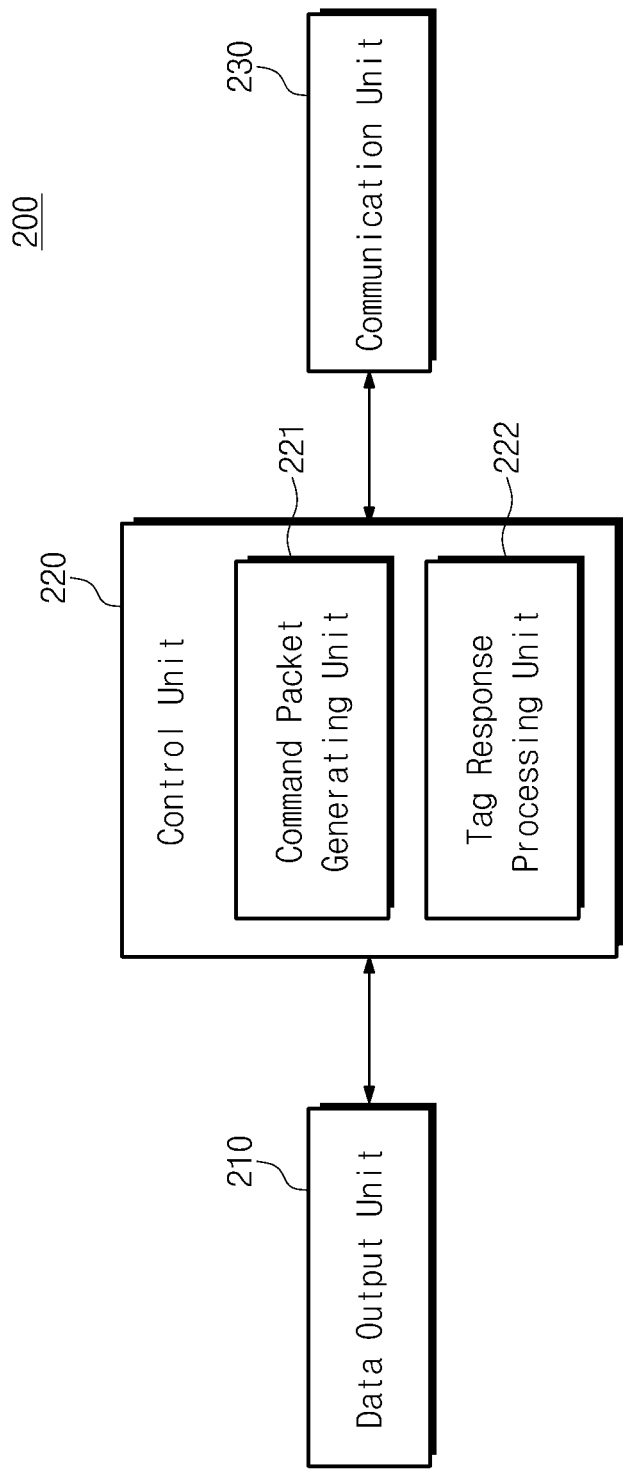

Fig. 4A

SB_INFO

| SB_INFO COMMAND | NOR |

Fig. 4B

SB_CONT

| SB_CONT COMMAND | Address | NOR |

Fig. 4C

SB_ACK

| SB_ACK COMMAND | PktSizeAdj | NOR |

SB_NACK

Packet data from RFID Tag

PASSIVE WIRELESS MEMORY DEVICE

CROSS-REFERENCE TO RELATED APPLICATIONS

This U.S. non-provisional patent application claims priority under 35 U.S.C. §119 to Korean Patent Application No. 10-2010-0014750, filed on Feb. 18, 2010, the entire contents of which are hereby incorporated by reference.

BACKGROUND

1. Field of the Invention

The present disclosure herein relates to a semiconductor memory device, and more particularly, to a passive wireless memory device.

2. Description of the Related Art

Radio Frequency Identification (RFID) technology is a field of automation data collection systems, which includes RFID tags and RFID readers. RFID tags transmit data to RFID readers in response to signals from the RFID readers.

RFID tags are attached to identification subjects such as automobiles, goods, and livestock to store information to identify the subjects. RFID readers receive information stored in the RFID tags in a contactless manner via wireless communication. That is, since RFID technology does not require direct contact or scanning in the visible band, the RFID technology is esteemed as an alternative technology to bar codes and has a wide applicable range, or varied applicable uses.

Particularly, the application potential of the RFID technologies is steadily increasing because encoding of information and renewal of data are possible in the RFID technology unlike a typical bar code technology and a larger amount of information may be more quickly delivered than in the bar code technology.

In general, the RFID technologies may be divided into technologies related to RFID tags and technologies related to RFID readers for reading the RFID tags. More specifically, the RFID technologies may be divided into detailed technical categories such as types of RFID tags, configuration of middleware, configuration for mobilization, and security-related configuration.

RFID tags store sensing information and identification codes of objects, and transmit stored information according to requests from RFID readers or other devices. RFID tags utilize aspects of various technologies including antenna and wireless signal processing, chip technologies, thin-film batteries, packaging technologies, and chip-downsizing technologies. RFID tags are divided into active RFID tags and passive RFID tags according to whether the RFID tags include their own power sources.

Active RFID tags have a relatively long communication distance and high transmission rate and enable transmission of large-capacity data. However, active RFID tags require periodic management, and have larger volumes and difficulties in installation due to internal power sources.

On the other hand, passive RFID tags are supplied with operating power from radio waves of RFID readers. Passive RFID tags have semi-permanent durability, and have more advantages than bar codes. Accordingly, passive RFID tags are used in logistic management systems, security systems, and logistic tracking systems. On the other hand, since passive RFID tags use power induced by approach of RFID readers as a power source, the passive RFID tags do not require a separate power source. However, the passive RFID tags have relatively short communication distances, and have difficulties in using large-capacity memories due to limitation of power management, resulting in restriction of the amount of transmission data.

Therefore, using the advantages of the active RFID tags provides large-capacity data and reduces the burden due to management or installation, and using the advantages of the passive RFID tags provides ease of management or installation and provides large-capacity data. Accordingly, many studies are being conducted to utilize RFIDs for applications required to provide multimedia or mass information

SUMMARY

The present disclosure provides a passive wireless memory device that transmits large-capacity data using a passive Radio Frequency Identification (RFID) tag.

Additional aspects and utilities of the present general inventive concept will be set forth in part in the description which follows and, in part, will be obvious from the description, or may be learned by practice of the present general inventive concept.

Embodiments of the present general inventive concept provide passive wireless memory devices including a memory unit and a passive tag to convert data stored in the memory unit into a data packet in response to first to third data request signals from a reader and to transmit the data packet to the reader. The passive tag determines the size of the data packet in response to the channel state predicting flag and the second and third data request signals.

The reader may transmit the first data request signal to the passive tag to allow the passive tag to access the memory unit, and the first data request signal may include an address of data to be accessed. The first data request signal may include a Number Of Response (NOR) flag, and the passive tag may be considered to receive the first data request signal from the reader as many times as a value of the NOR flag.

When data transmission from the passive tag is normal, the reader may transmit the second data request signal to the passive tag, and the passive tag may transmit data located at a next address to an address of already-transmitted data to the reader in response to the second data request signal. The second data request signal may include a first packet size adjustment flag, and the passive tag may determine a size of the data packet by referring to the channel state predicting flag and the first packet size adjustment flag. When the channel state predicting flag represents a best channel state, and the first packet size adjustment flag is activated, the passive tag may increase the size of the data packet. When the channel state predicting flag does not represent a best channel state, or the first packet size adjustment flag is inactivated, the passive tag may maintain the size of the data packet. The passive tag may increase a value of the channel state predicting flag in response to the activated first packet size adjustment flag. The second data request signal may include a Number Of Response (NOR) flag, and the passive tag may be considered to receive the second data request signal from the reader as many times as a value of the NOR flag.

When data transmission from the passive tag is abnormal, the reader may transmit the third data request signal to the passive tag. The passive tag may transmit already-transmitted data to the reader in response to the third data request signal. The third data request signal may include a second packet size adjustment flag, and the passive tag may determine a size of the data packet by referring to the channel state predicting flag and the second packet size adjustment flag. When the channel state predicting flag represents a worst channel state, and the second packet size adjustment flag is activated, the passive tag may reduce the size of the data packet. When the channel state predicting flag does not represent a worst channel state, or the second packet size adjustment flag is inactivated, the passive tag may maintain the size of the data packet. The passive tag may reduce a value of the channel state predicting flag in response to the activated second packet size adjustment flag. The third data request signal may include a Number Of Response (NOR) flag, and the passive tag may be considered to receive the third data request signal from the reader as many times as a value of the NOR flag.

The channel state predicting flag may be configured with an n-bit counter. The channel state predicting flag may divide 2n channel states. The passive tag may use a radio signal from the reader as a power source.

Features and/or utilities of the present general inventive concept may be realized by an RFID reader including a communication unit to transmit and receive data, and a control unit to generate command packets to transmit to an RFID tag and to process response data received from the RFID tag in response to the command packets.

The command packets may include at least a data request packet to instruct the RFID tag to transmit to the RFID reader data.

Each of the command packets may include a Number Of Response flag that indicates a number of times the command packet is transmitted to the RFID tag.

The command packets may further include an acknowledge command packet to acknowledge successful receipt of requested data and a non-acknowledge command packet to indicate that the requested data was not successfully received.

Each of the acknowledge and non-acknowledge command packets may include a packet size adjustment flag to direct the RFID tag whether to adjust a size of a next data packet transmitted to the RFID reader.

When the control unit generates a data request packet corresponding to data having a size greater than a single data packet, the communication unit may receive multiple data packets corresponding to the requested data from the RFID tag without transmitting multiple data request packets.

The command packets may further include a meta data request packet to request meta data from the RFID tag including characteristics of the data accessible by the RFID tag.

The meta data may include at least one of a file name, a file extension, codec information, and a created date of data accessible by the RFID tag.

Features and/or utilities of the present general inventive concept may also be realized by an RFID tag including an antenna to transmit and receive data to and from a radio device, radio communication unit to process data to transmit to, and received from, the antenna, and a tag control unit to control a packet size of data transmitted to the antenna according to a detected signal characteristic of a data transmission signal between the antenna and the radio device.

The RFID tag may further include a memory unit to store data, wherein the radio communication unit may determine an address of data in the memory unit to transmit to the radio unit via the antenna.

The tag control unit may include a predict flag to indicate a state of the characteristic of the data transmission signal, and the radio communication unit may determine whether to change the packet size of data transmitted to the antenna based on the state of the predict flag.

The predict flag may be a 2-bit counter.

Features and/or utilities of the present general inventive concept may also be realized by an RFID system including an RFID reader including a communication unit to transmit and receive data, and a control unit to generate command packets to transmit for transmission via the communication unit and to process data received via the communication unit, and an RFID tag to transmit data to the RFID reader in response to a command packet, the RFID tag including a tag control unit to control a packet size of data transmitted to the RFID reader according to a detected signal characteristic of a data transmission signal between the RFID tag and the RFID reader.

The command packets may include a packet size adjustment flag to change a size of a next data packet transmitted from the RFID tag to the RFID reader.

The tag control unit of the RFID tag may determine a state of the detected signal characteristic of the data transmission signal and changes the size of the next data packet transmitted to the RFID reader based on the determined state of the detected signal characteristic and the packet size adjustment flag.

The tag control unit may include a predict flag to indicate the state of the detected signal characteristic, the predict flag indicating one of at least two states of the detected signal characteristic, wherein the RFID tag changes the size of the next data packed transmitted to the RFID reader when the packet size adjustment flag indicates a change in packet size and the state of the predict flag indicates a change in packet size, and the RFID tag does not change the size of the next data packed transmitted to the RFID reader when the packet size adjustment flag indicates a change in packet size and the state of the predict flag indicates no change in packet size.

Features and/or utilities of the present general inventive concept may also be realized by a method of communicating from an RFID reader, the method comprising generating a command packet to transmit to an RFID tag, the command packet including a Number of Response flag that indicates a number of times the command packet is transmitted to the RFID tag.

The command packet may be a data request packet to instruct the RFID tag to transmit to the RFID reader data.

The command packet may be at least one of an acknowledge command packet to acknowledge successful receipt of requested data and a non-acknowledge command packet to indicate that the requested data was not successfully received.

The method may further include setting a packet size adjustment flag in the command packet to direct the RFID tag to adjust a size of a next data packet transmitted to the RFID reader.

The command packet may include a first command packet having address information and a second command packet that does not include address information, and the method may further include transmitting to the RFID tag the first command packet to request data having a packet size of at least two data packets including a first and a second data packet at the address indicated by the address information, receiving the first data packet from the RFID tag, transmitting to the RFID tag the second command packet to acknowledge receipt of a data packet, and receiving the second data packet from the RFID tag.

The second command packet may include information to adjust a size of the second data packet with respect to the first data packet.

Features and/or utilities of the present general inventive concept may also be realized by a method of controlling an RFID tag, the method including detecting a characteristic of a data communication signal between the RFID tag and a radio device, and controlling a rate at which a size of a data packet transmitted to the radio device may be adjusted based on the detected characteristic.

The method may further include receiving from the radio device a command to transmit the data packet to the radio device, accessing memory at an address indicated by the command, and transmitting to the radio device the data packet including the data located at the address.

The command may include a packet size flag to indicate a change in size of the data packet relative to a previous data packet, and the method may further include changing a size of the data packet according to the detected characteristic of the data communication signal and the packet size flag.

Detecting a characteristic of the data communication signal may include setting a predict flag to reflect a state of the detected characteristic, and the method may further include changing the size of the data packet when the packet size flag indicates a change in packet size and the predict flag indicates a change in packet size, and leaving the size of the data packet unchanged when the packet size flag indicates a change in packet size and the predict flag indicates no change in packet size.

BRIEF DESCRIPTION OF THE DRAWINGS

The accompanying drawings are included to provide a further understanding of the present general inventive concept, and are incorporated in, and constitute a part of, this specification. The drawings illustrate exemplary embodiments of the general inventive concept and, together with the description, serve to explain principles of the inventive concept. The above and/or other aspects of the present general inventive concept will become apparent and more readily appreciated from the following description of the exemplary embodiments, taken in conjunction with the accompanying drawings, in which:

FIG. 1 is a block diagram illustrating a wireless memory system including a passive wireless memory device according to an exemplary embodiment of the present general inventive concept;

FIG. 2A is a block diagram illustrating a Radio Frequency Identification (RFID) reader according to an exemplary embodiment of the present general inventive concept;

FIGS. 4A to 4E are diagrams illustrating command packets that an RFID reader sends to an RFID tag and a data packet that the RFID tag sends to the RFID reader according to an exemplary embodiment of the present general inventive concept;

DETAILED DESCRIPTION OF THE EMBODIMENTS

Figure 2B:
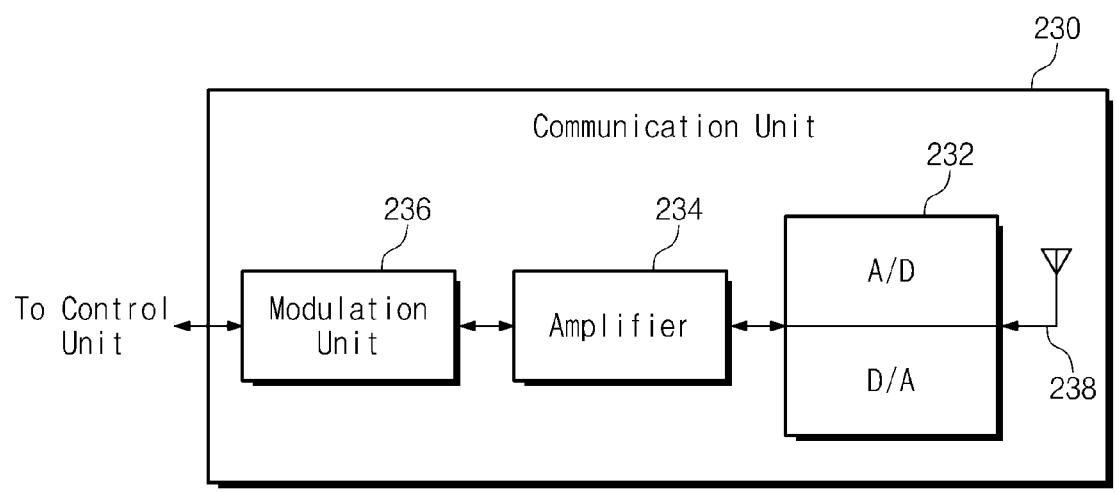
FIG. 2B is a block diagram illustrating a communication unit of an RFID reader.

Exemplary embodiments of the present general inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It should be construed that forgoing general illustrations and following detailed descriptions are exemplified and an additional explanation of claimed inventions is provided. Reference numerals are indicated in detail in preferred embodiments of the present general inventive concept, and their examples are represented in reference drawings. In every possible case, like reference numerals are used to refer to the same or similar elements in the description and drawings.

Below, a Radio Frequency Identification (RFID) tag and an RFID reader are used as one example for illustrating characteristics and functions of the present general inventive concept. However, those skilled in the art can easily understand other advantages and applications of the present general inventive concept according to the description provided. The present general inventive concept may be embodied or applied through other embodiments.

In the present specification and claims, the terms "first," "second," "third," etc. may be used to identify elements. Unless otherwise specified, these identifiers are used only to differentiate between elements and not to indicate a particular order or level of significance. When the term "chronological" is used in combination with these terms, then the terms "first," "second," "third," etc. indicate a chronological order.

FIG. 1 is a block diagram illustrating a wireless memory system including a passive wireless memory device according to an exemplary embodiment of the present general inventive concept. Referring to FIG. 1, the wireless memory system may include a data processing unit 100, an RFID reader 200, an RFID tag 300, and a memory unit 400. The RFID tag 300 and the memory unit 400 may form a passive wireless memory device. When the RFID tag 300 is a passive wireless device, the RFID tag 300 receives a wireless signal which generates current in the RFID tag 300 to operate the circuitry of the RFID tag 300.

The RFID tag 300 may be a separate device from the memory unit 400 that is electrically connected to the memory unit 400. Alternatively, the memory unit 400 may be integrated into the RFID tag 300 as a single device. The RFID tag 300 may access the memory unit 400 in response to commands from the RFID reader 200. The RFID tag may deliver data stored in the memory unit 400 to the RFID reader 200. The data stored in the memory unit 400 may include streaming data such as voices, music, images, and videos that have to be continuously transmitted for replay, as well as general digital data such as files.

The RFID reader 200 may receive data from the RFID tag 300 via wireless communication. The RFID reader 200 may deliver the received data to the data processing unit 100. The data processing unit 100 may process the received data. For example, the data processing unit 100 may process transmitted image data to be displayed on a display device. The data processing unit 100 may be implemented in various forms such as personal computers, mobile phones, notebooks, and smart phones.

FIG. 2A is a block diagram illustrating an RFID reader 200 according to an exemplary embodiment of the present general inventive concept. Referring to FIG. 2A, the RFID reader 200 may include a data output unit 210, a control unit 220, and a communication unit 230.

The components 210, 220 and 230 of the RFID reader 200 may be implemented in a software manner through programs that operate in a general-purpose processor and a Digital Signal Processor (DSP), or may be configured in a chip or module by Field-Programmable Gate Array (FPGA) or Application-Specific Integrated Circuit (ASIC), System on Chip (SoC), or Package on Chip (PoC).

The data output unit 210 may receive data from the control unit 220. The data output unit 210 may deliver the received data to the data processing unit 100. The data may include at least one of audio data, image data, and data files. There is no limitation on the type and format of data. Also, the data output unit 210 may be configured to include means for to convert data using pre-processors such as audio/video codecs according to purposes of the data and efficiently managing the data.

The control unit 220 may control overall operation of the RFID reader 200. The control unit 220 may perform protocol processing to process communication protocols amended to process responses and new commands to transmit large-capacity data.

According to an exemplary embodiment of the present general inventive concept, the control unit 220 may include a command packet generating unit 221 and a tag response processing unit 222. The command packet generating unit 221 may generate command packets including commands for data transmission. Also, the command packet generating unit 221 may generate a command packet including commands to verify whether data is successfully received from the RFID tag 300. The commands to transmit data will be described in detail with reference to FIGS. 4A to 4E.

The tag response processing unit 222 may process a data packet received from the RFID tag 300 through RF signals.

The communication unit 230 may convert the RF signals received from the RFID tag 300 into digital data, and may deliver the digital data to the control unit 220. Alternatively, the communication unit 230 may convert digital signals from the control unit 220 into RF signals, and deliver the RF signal to the RFID tag 300. The communication unit 230 may convert RF signals received from the RFID tag 300 into digital data.

The communication unit 230 may perform signal amplification and modulation on the command packet, and may transmit the command packet over a certain frequency band, e.g., between about 860 MHz and about 960 MHz, defined in the RFID standards. A modulator or a demodulator included in the communication unit 230 may be configured to perform signal processing in a digital or analog manner.

FIG. 2B is a block diagram illustrating a communication unit 230 of an RFID reader 200. The communication unit 230 may include an antenna 238 to send and receive data signals. When receiving data, the data signals may be converted to a digital signal at an analog-to-digital converter 232, amplified at an amplifier 234, and de-modulated at the modulation unit 236. The de-modulated digital signal may be transmitted to the control unit 220 for processing. When transmitting data, the modulation unit 236 may modulate the data, the amplifier 234 may amplify (or de-amplify) the data, and the digital-to-analog converter 232 may convert the digital signal to an analog signal that is transmitted to the antenna 238 to be wirelessly transmitted to an external device.

Figure 3:
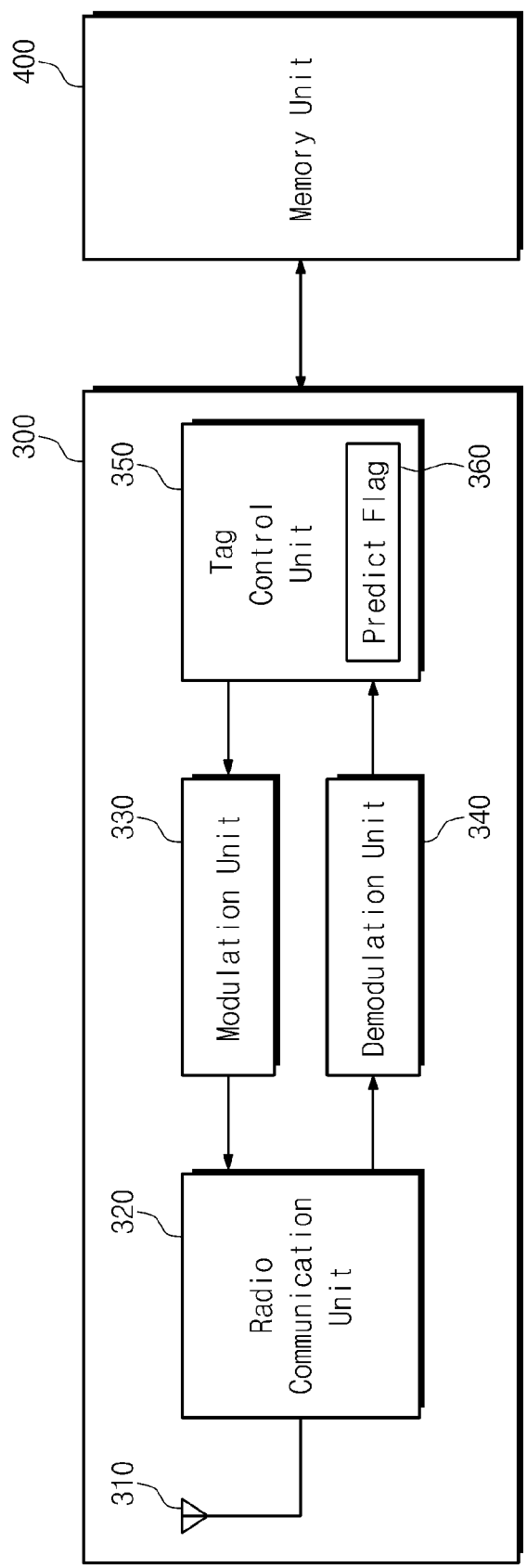
FIG. 3 is a block diagram illustrating an RFID tag and a memory unit according to an exemplary embodiment of the present general inventive concept.

FIG. 3 is a block diagram illustrating an RFID tag 300 and a memory unit 400 according to an exemplary embodiment of the present general inventive concept. The RFID tag 300 may include an antenna 310, a radio communication unit 320, a modulation unit 330, a demodulation unit 340, and a tag control unit 350.

The antenna 310 may receive signal from the RFID reader 200, or send signals to the RFID reader 200. The radio communication unit 320 may be connected to the antenna 310. The radio communication unit 320 may amplify and/or filter transmitted/received signals to support smooth radio communication.

The modulation unit 330 may convert digital data to be transmitted to the RFID reader 200 into data having a suitable format for the radio communication unit 320. The demodulation unit 340 may convert signals from the RFID reader 200 into digital data.

The tag control unit 350 may receive commands from the demodulation unit 340. The tag control unit 350 may access the memory unit 400 according to the received commands. The tag control unit 350 may substantially control radio communication between the RFID tag 300 and the RFID reader 200 by generating and transmitting data signals to the RFID reader 200 after reading data from the memory unit 400.

The tag control unit 350 may include a predicting flag 360. The condition of communication channel or data transmission signal may vary according to various factors. The predicting flag 360 may be a parameter representing the condition of the communication channel or data transmission signal. For example, the predicting flag 360 may divide the condition of the communication channel into strongly worse, weakly worse, weakly better, and strongly better. The conditions may be determined by comparing error rates of received data to predetermined thresholds, determining transmission times of data, determining noise or interference in a wireless signal, or any other parameter to measure a strength of a communication signal.

The predicting flag 360 may be implemented using a 2-bit counter to divide the condition of the communication channel. The 2-bit counter may increase when the channel condition gets better, and may decrease when the channel condition gets worse.

The predicting flag 360 may contribute to prevention of frequent variation of a packet size according to the suddenly-changing channel condition. The function of the predicting flag 360 will be described in detail with reference to FIGS. 4A to 4E.

The modulation unit 330, the demodulation unit 340, the tag control unit 350, and the memory unit 400 may be packaged in an IC chip. The memory unit 400 may include a flash memory that may store large-capacity data having a size of more than a Gigabyte. Furthermore, the memory unit 400 may be detachable from, and attachable to, the RFID tag 300. For this, the RFID tag 300 and the memory unit 400 may be connected to each other through a USB or other connectors enabling transfer of power and data.

On the other hand, the RFID tag 300 may be used as a storage medium of multimedia contents. In this case, identification data (meta data) of multimedia contents as first data and multimedia contents data as second data may be stored in the memory unit 400.

The first data may be meta data that allows large multimedia content data stored in the memory unit 400 to be identified by general-purpose information processing devices such as computers. For example, the first data may be a music title of a text format for a music file, a captured screen of an image format and/or a video title for a video file, a thumbnail of an image format for an image file, and a title of a text format and/or an icon for a data file.

The second data may be at least one of large-capacity multimedia content data such as music, video, image, and data files that may be executable by Operating Systems (OS) or application programs of general-purpose information processing devices such as computers.

The RFID tag 300 may generate and send a first data signal based on the first data by a SB_INFO command from the RFID reader 200. Also, the RFID tag 300 may generate and send a second data signal based on the second data by an SB_CONT command from the RFID reader 200. Thus, the RFID tag 300 may store large-capacity multimedia data, and enable efficient management.

FIGS. 4A to 4E are diagrams illustrating command packets that an RFID reader sends to an RFID tag and a data packet that the RFID tag sends to the RFID reader according to an exemplary embodiment of the present general inventive concept.

FIG. 4A shows a SB_INFO command packet. The SB_INFO command packet may include a SB_INFO command and a NOR flag. The SB_INFO command may be a command to access meta data from the memory unit 400, and the NOR flag may be a Number Of Response flag to indicate a number of times that the SB_INFO command packet will be sent.

The meta data may be data to identify data stored in the memory unit 400. For example, the meta data may include a file name, a file extension, codec information, and a created date of video data. The RFID tag 300 may transmit meta data of the data stored in the memory unit 400 to the RFID reader 200 in response to the SB_INFO command from the RFID reader 200.

The NOR flag represents the iteration number of the SB_INFO command. For example, when the value of the NOR flag is four, there is an effect that the SB_INFO command is transmitted from the RFID reader 200 to the RFID tag 300 four times. Accordingly, command packet transmission may be minimized between the RFID reader 200 and the RFID tag 300 by adjusting the value of the NOR flag.

It is more advantageous in the RFID technology that the amount of command packet transmission becomes smaller between the RFID reader 200 and the RFID tag 300. This is because the command packet transmission reduces overall data transmission rate. Accordingly, the command packet transmission may be minimized by the NOR flag, thereby improving the data transmission rate. In particular, instead of repeatedly sending a same number of commands to transmit data regardless of a communication signal strength, the NOR flag may be adjusted to a small number when a communication signal is strong and few errors are encountered or predicted in the transmission. Then, instead of the RFID tag 300 sending a re-send request when a command is not received, the RFID tag 300 may receive one of the repeatedly-sent command packets, and the number of command packets to be sent in subsequent commands may be adjusted based on the number of received command packets, for example.

FIG. 4B shows an SB_CONT command packet. The SB_CONT command packet may include an SB_CONT command and a NOR flag. The SB_CONT command may be a command to access data stored in the memory unit 400.

The memory unit 400 may store various types of data. For example, the memory unit 400 may store video data, voice data, music data, and text data. The RFID tag 300 may transmit data stored in the memory unit 400 to the RFID reader in response to the SB_CONT command from the RFID reader 200.

The NOR flag represents the iteration number of the SB_INFO command. For example, when the value of the NOR flag is four, there is an effect that the SB_CONT command is transmitted from the RFID reader 200 to the RFID tag 300 four times. Accordingly, command packet transmission may be minimized between the RFID reader 200 and the RFID tag 300, thereby improving the data transmission rate.

FIG. 4C shows an SB_ACK command packet. The SB_ACK command packet may include an SB_ACK command, a packet size adjustment flag PktSizeAdj, and a NOR flag. The SB_ACK command may be a signal representing that data transmission from the RFID tag 300 to the RFID reader 200 is successful. That is, when the RFID reader 200 receives data packet from the RFID tag 300 successfully, the RFID reader 200 may transmit the SB_ACK command to the RFID tag 300.

The RFID tag 300 may transmit data stored in the next address following the previously transmitted data to the RFID reader 200, by referring to the SB_ACK command from the RFID reader 200. Accordingly, data transmission may be performed without address transmission from the RFID reader 200 to the RFID tag 300.

The packet size adjustment flag PktSizeAdj may determine the size of the data packet. When the value of the packet size adjustment flag PktSizeAdj is set to 1 in the SB_ACK command packet, the size of the data packet increases two-fold, or doubles. On the other hand, when the value of the packet size adjustment flag PktSizeAdj is set to 0 in the SB_ACK command packet, the size of the data packet is maintained.

For example, if the RFID reader 200 sets the value of the packet size adjustment flag PktSizeAdj in the SB_ACK command packet to 1 and transmits it to the RFID tag 300, the RFID tag 300 may increase the size of the data packet two-fold and transmit the increased data packet to the RFID tag 300. On the other hand, if the RFID reader 200 sets the value of the packet size adjustment flag PktSizeAdj in the SB_ACK command packet to 0 and transmits it to the RFID tag 300, the RFID tag 300 may maintain the size of the data packet and transmit the data packet to the RFID tag 300.

The value of the packet size adjustment flag PktSizeAdj may be determined according to the condition of the communication channel. For example, when the condition of the communication channel is good, the value of the packet size adjustment flag PktSizeAdj may be set to 1. On the other hand, when the condition of the communication channel is poor, the value of the packet size adjustment flag PktSizeAdj may be set to 0. Thus, flexible data communication according to the condition of the communication channel may be implemented by adjusting the size of the packet according to the condition of the communication channel.

The NOR flag represents the iteration number of the SB_ACK command. For example, when the value of the NOR flag is four, there is an effect that the SB_ACK command is transmitted from the RFID reader 200 to the RFID tag 300 four times. Accordingly, command packet transmission may be minimized between the RFID reader 200 and the RFID tag 300, thereby improving the data transmission rate.

Figure 4D:

FIG. 4D shows an SB_NACK command packet. The SB_NACK command packet may include an SB_NACK command, a packet size adjustment flag PktSizeAdj, and a NOR flag. The SB_NACK command may be a signal representing that data transmission from the RFID tag 300 to the RFID reader 200 is unsuccessful. That is, when the RFID reader 200 does not receive data packet from the RFID tag 300 successfully, the RFID reader 200 may transmit the SB_NACK command to the RFID tag 300.

The RFID tag 300 may transmit the previously transmitted data again to the RFID reader 200, by referring to the SB_NACK command from the RFID reader 200. Accordingly, data transmission may be performed without address transmission from the RFID reader 200 to the RFID tag 300 to reduce a size of the data transmission from the RFID reader 200 to the RFID tag 300.

The packet size adjustment flag PktSizeAdj may determine the size of the data packet. When the value of the packet size adjustment flag PktSizeAdj is set to 1 in the SB_NACK command packet, the size of the data packet is reduced by half. On the other hand, when the value of the packet size adjustment flag PktSizeAdj is set to 0 in the SB_NACK command packet, the size of the data packet is maintained.

For example, if the RFID reader 200 sets the value of the packet size adjustment flag PktSizeAdj in the SB_NACK command packet to 1 and transmits it to the RFID tag 300, the RFID tag 300 may reduce the size of the data packet by half and transmit the reduced data packet to the RFID tag 300. On the other hand, if the RFID reader 200 sets the value of the packet size adjustment flag PktSizeAdj in the SB_NACK command packet to 0 and transmits it to the RFID tag 300, the RFID tag 300 may maintain the size of the data packet and transmit the data packet to the RFID tag 300.

The value of the packet size adjustment flag PktSizeAdj may be determined according to the condition of the communication channel. For example, when the condition of the communication channel is good, the value of the packet size adjustment flag PktSizeAdj may be set to 0. On the other hand, when the condition of the communication channel is poor, the value of the packet size adjustment flag PktSizeAdj may be set to 1. Thus, flexible data communication according to the condition of the communication channel may be implemented by adjusting the size of the packet according to the condition of the communication channel.

However, sudden changes of channel condition may result in a sudden change in the packet size, resulting in degradation of system performance. In an exemplary embodiment of the inventive concept, the predicting flag 360 as shown in FIG. 3 may prevent rapid changes of packet sizes.

As described above, the predicting flag 360 may divide the condition of the communication channel into four steps of strongly worse, weakly worse, weakly better, and strongly better. For example, the predicting flag 360 may be configured using a 2-bit counter.

In an exemplary embodiment of the inventive concept, when the predicting flag 360 is strongly better, and the value of the packet size adjustment flag PktSizeAdj in the SB_ACK command packet is 1, the packet size increases. Also, when the predicting flag 360 is strongly worse, and the value of the packet size adjustment flag PktSizeAdj in the SB_NACK command packet is 1, the packet size decreases. On the other hand, when the predicting flag 360 is weakly better or weakly worse, and the value of the packet size adjustment flag PktSizeAdj in the SB_ACK command packet is 1, the packet size may stay the same. Also, when the predicting flag 360 is weakly better or weakly worse, and the value of the packet size adjustment flag PktSizeAdj in the SB_NACK command packet is 1, the packet size may stay the same. Accordingly, the sudden change of the packet size may be prevented.

However, the inventive concept will not be limited to the examples described above. The predicting flag 360 may be divided into an arbitrary number of steps. For example, the predicting flag 360 may divide the condition of the communication channel into eight steps. In this case, the predicting flag 360 may be configured using a 3-bit counter.

The NOR flag represents the iteration number of the SB_NACK command. For example, when the value of the NOR flag is four, there is an effect that the SB_ACK command is transmitted from the RFID reader 200 to the RFID tag 300 four times. Accordingly, command packet transmission may be minimized between the RFID reader 200 and the RFID tag 300, thereby improving the data transmission rate.

Figure 4E:

FIG. 4E shows a data packet transmitted from the RFID tag 300 to the RFID reader 200. The data packet may include a packet size and a data. The packet size may be changed by the predicting flag 360 and the packet size adjustment flag PktSizeAdj.

As described above, the passive RFID tag 300 according to an exemplary embodiment of the general inventive concept may perform a data processing operation other than that defined in typical RFID communication standards. Accordingly, a data state may be added to a tag state defined in the typical standards. The RFID tag 300 may enter the data state when receiving a SB_CONT command packet from the RFID reader 200. Once entering the data state, the RFID tag 300 may continuously process commands from the RFID reader 200 without a state change, thereby performing large-capacity data processing continuously.

Figure 5:
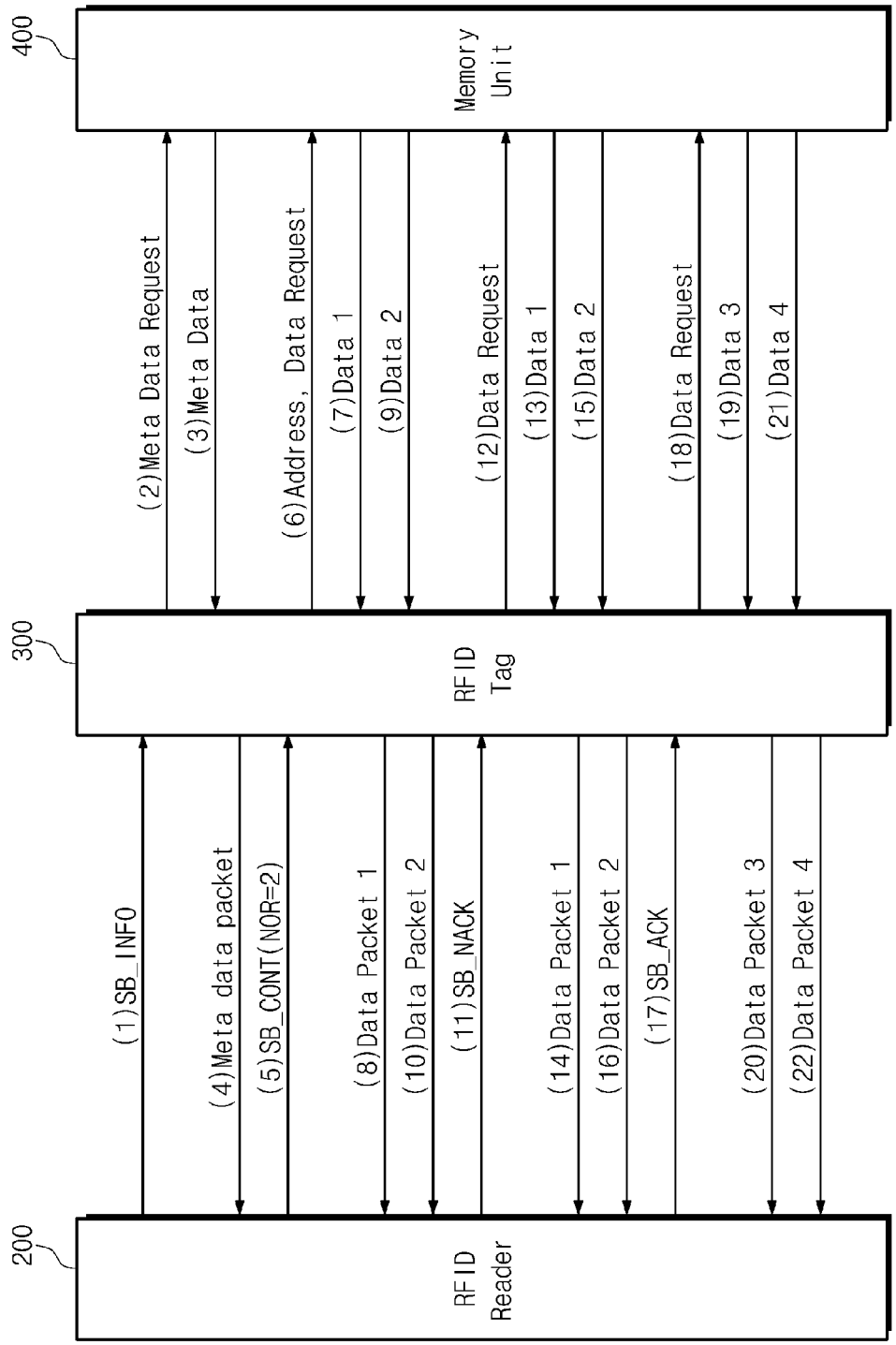
FIG. 5 is a diagram illustrating data transmission among an RFID reader, an RFID tag, and a memory unit according to an exemplary embodiment of the present general inventive concept.

FIG. 5 is a diagram illustrating data transmission among an RFID reader 200, an RFID tag 300, and a memory unit 400 according to an exemplary embodiment of the present general inventive concept.

First, the RFID reader 200 may transmit an SB_INFO command to the RFID tag 300 to obtain meta data of data stored in the memory unit 400 (1). The RFID tag 300 may request meta data transmission from the memory device 400 in response to the SB_INFO command (2).

The memory unit 400 may transmit meta data to the RFID tag 300 in response to the request of the meta data transmission (3). The RFID tag 300 may transmit the meta data received from the memory unit 400 to the RFID reader 200 (4).

The RFID reader 200 may transmit an SB_CONT command to the RFID tag 300 to access the data stored in the memory unit 400 by referring to the meta data (5). As described above, the SB_CONT command may include a data address and a NOR flag. For example, the value of the NOR flag is 2 in FIG. 5.

The RFID tag 300 may transmit the data address and the data transmission request to the memory unit 400 in response to the SB_CONT command (6). The memory unit 400 may transmit the data to the RFID tag 300 in response to the data transmission request (7). The RFID tag 300 may convert the data received from the memory unit 400 into a packet, and transmit the packet to the RFID reader 200 (8). Also, the memory unit 400 may transmit the data to the RFID tag 300 (9). The RFID tag 300 may convert the data received from the memory unit 400 into a packet and transmit the packet to the RFID reader 200 (10). Eventually, since the value of the NOR flag is 2, it should be understood that the RFID tag 300 has transmitted two data packets to the RFID tag 300.

When the data packet that the RFID reader 200 has received from the RFID tag 300 is not normal, the RFID reader 200 may transmit an SB_NACK command to the RFID tag 300 (11). The RFID tag 300 may request the memory unit 400 to transmit the already-transmitted data again in response to the SB_NACK command (12). Since the already-transmitted data is transmitted, an additional address is not required. Accordingly, overhead due to address transmission may not occur.

The memory unit 400 may transmit the data to the RFID tag 300 in response to the request by the RFID tag 300 (13 and 15). The RFID tag 300 may process the data received from the memory unit 400 into a data packet, and transmit the data packet to the RFID reader 200 (14 and 16).

When the data that the RFID reader 200 has received from the RFID tag 300 is normal, the RFID reader 200 may transmit an SB_ACK command to the RFID tag 300 (17). The RFID tag 300 may request the memory unit 400 to transmit data located at the next address to the address of the already-transmitted data in response to the SB_ACK command (18). Since the data located at the next address to the address of the already-transmitted data is transmitted, an additional address is not required. Accordingly, overhead due to address transmission may not occur.

The memory unit 400 may transmit the data to the RFID tag 300 in response to the request by the RFID tag 300 (19 and 21). The RFID tag 300 may process the data received from the memory unit 400 into a data packet, and transmit the data packet to the RFID reader 200 (20 and 22).

Figure 6:
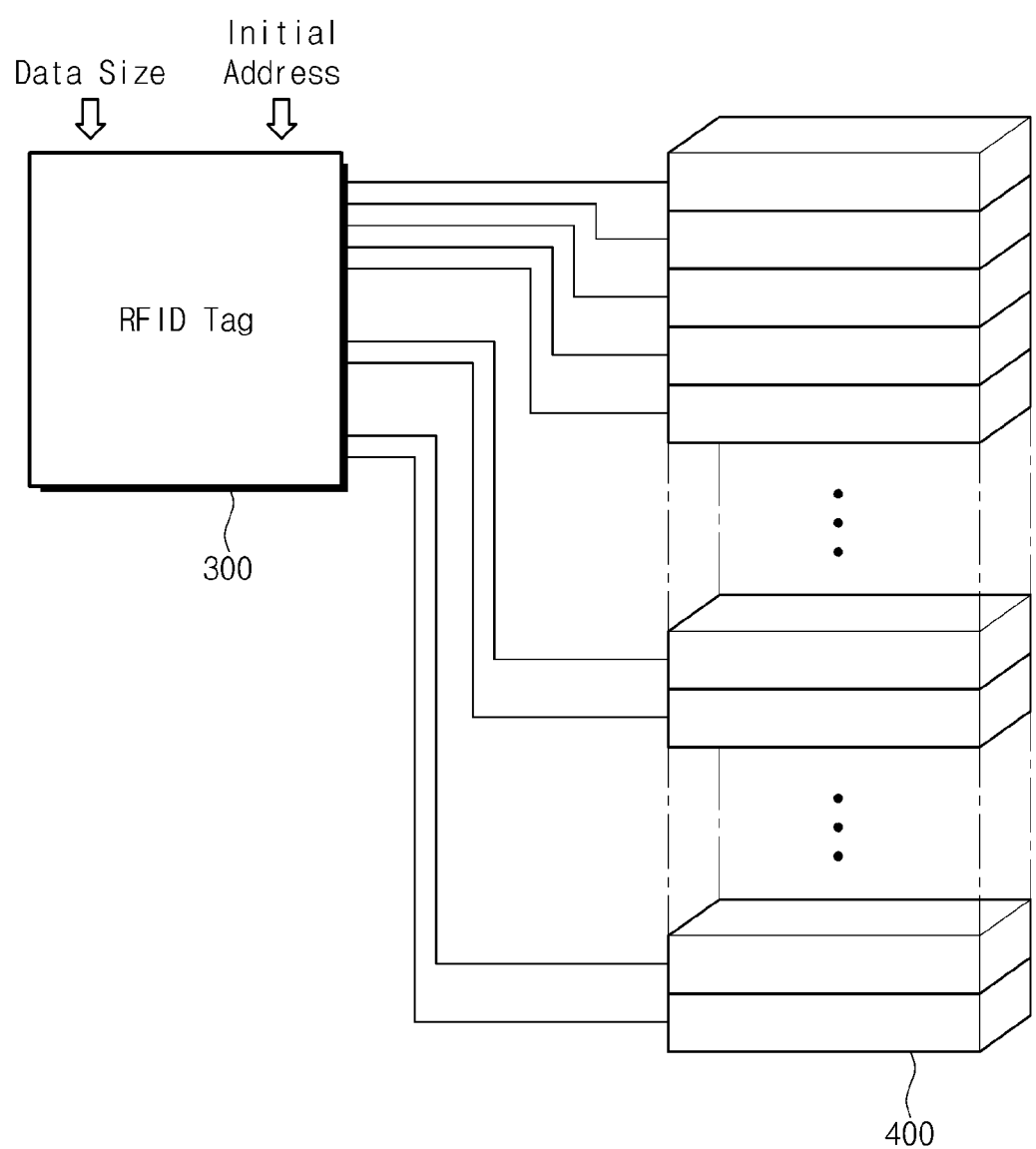
FIG. 6 is a block diagram illustrating more detailed configuration and operation of an RFID tag and a memory unit according to an exemplary embodiment of the present general inventive concept.

FIG. 6 is a block diagram illustrating more detailed configuration and operation of an RFID tag 300 and a memory unit 400 according to an exemplary embodiment of the present general inventive concept. Hereinafter, the principle of to transmit large-capacity data stored in the RFID 300 to the RFID reader 200 at low electric power will be described in detail with reference to FIG. 6.

In the passive RFID system, an RFID tag is supplied with power from an RFID reader, there is a limitation on power usable in the RFID tag. Accordingly, the size of a memory usable in a typical RFID tag has been limited.

The memory unit 400 according to an exemplary embodiment of the present general inventive concept may include a plurality of memory banks. The respective memory banks may be changed into an active state or an inactive state according to signals provided from the RFID tag 300. In the active state, the respective memory banks may be powered off or enter a standby mode. The respective memory banks may be supplied with power only in the active state. That is, the signals provided from the RFID tag 300 may be a signal for determining power supply, and may further serve as substantial power.

For example, it will be assumed that the size of the memory unit 400 is about 256 MB, and the size of the respective memory banks is about 128 KB. Accordingly, only ½₀₀₀ the power of all memory banks operating is required.

On the other hand, the large-capacity data may be sequentially stored in the memory unit 400. Read condition of such sequential data may simplify operation of the RFID tag 300 and may reduce cost and power.

According to exemplary embodiments of the present general inventive concept, data transmission rate of a passive wireless memory device increases. Also, adaptive data transmission is enabled according to channel conditions.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:

1. A passive wireless memory device comprising:
    a memory unit; and
    a passive tag to convert data stored in the memory unit into a data packet in response to first to third chronological data request signals from a reader and to transmit the data packet to the reader,
    wherein the passive tag determines the size of the data packet in response to a channel state predicting flag and the second and third data request signals, and
    wherein the second data request signal comprises a first packet size adjustment flag, and the passive tag determines a size of the data packet by referring to the channel state predicting flag and the first packet size adjustment flag.

2. The passive wireless memory device of claim 1, wherein the reader transmits the first data request signal to the passive tag to allow the passive tag to access the memory unit, the first data request signal comprising an address of data to be accessed.

3. The passive wireless memory device of claim 2, wherein the first data request signal comprises a Number Of Response (NOR) flag, and the passive tag receives the first data request signal from the reader as many times as a value of the NOR flag.

4. The passive wireless memory device of claim 1, wherein when data transmission from the passive tag is normal, the reader transmits the second data request signal to the passive tag, the passive tag to transmit data located at a next address to an address of already-transmitted data to the reader in response to the second data request signal.

5. The passive wireless memory device of claim 4, wherein the second data request signal comprises a Number Of Response (NOR) flag, and the passive tag receives the second data request signal from the reader as many times as a value of the NOR flag.

6. The passive wireless memory device of claim 1, wherein, when data transmission from the passive tag is abnormal, the reader transmits the third data request signal to the passive tag, and the passive tag transmits already-transmitted data to the reader in response to the third data request signal.

7. The passive wireless memory device of claim 6, wherein the third data request signal comprises a second packet size adjustment flag, and the passive tag determines a size of the data packet by referring to the channel state predicting flag and the second packet size adjustment flag.

8. The passive wireless memory device of claim 6, wherein the third data request signal comprises a Number Of Response (NOR) flag, and the passive tag is considered to receive the third data request signal from the reader as many times as a value of the NOR flag.

9. The passive wireless memory device of claim 1, wherein the channel state predicting flag is configured with an n-bit counter, where n is a whole number greater than 0.

10. The passive wireless memory device of claim 9, wherein the channel state predicting flag divides $2^n$ channel states.

11. An RFID reader, comprising:
    a communication unit to transmit and receive data; and
    a control unit to generate command packets to transmit to an RFID tag and to process response data received from the RFID tag in response to the command packets,
    wherein a first command packet includes at least a data request packet to instruct the RFID tag to transmit to the RFID reader data, and
    wherein a subsequent command packet includes a packet size adjustment flag to direct the RFID tag whether to adjust a size of a next data packet transmitted to the RFID reader based on the packet size adjustment flag and a channel state predicting flag.

12. The RFID reader of claim 11, wherein each of the command packets includes a Number Of Response flag that indicates a number of times the command packet is transmitted to the RFID tag.

13. The RFID reader of claim 11, wherein the command packets further include an acknowledge command packet to acknowledge successful receipt of requested data and a non-acknowledge command packet to indicate that the requested data was not successfully received.

14. The RFID reader of claim 13, wherein each of the acknowledge and non-acknowledge command packets includes a packet size adjustment flag to direct the RFID tag whether to adjust a size of a next data packet transmitted to the RFID reader.

15. The RFID reader of claim 11, wherein when the control unit generates a data request packet corresponding to data having a size greater than a single data packet, the communication unit receives multiple data packets corresponding to the requested data from the RFID tag without transmitting multiple data request packets.

16. The RFID reader of claim 11, wherein the command packets further include a meta data request packet to request meta data from the RFID tag including characteristics of the data accessible by the RFID tag,
   wherein the meta data includes at least one of a file name, a file extension, codec information, and a created date of data accessible by the RFID tag.

17. An RFID tag, comprising:
   an antenna to transmit and receive data to and from a radio device;
   a radio communication unit to process data to transmit to, and receive from, the antenna; and
   a tag control unit to control a packet size of data transmitted to the antenna according to a packet size adjustment flag received in a data request subsequent to a first data request and a channel state predicting flag which indicates a detected signal characteristic of a data transmission signal between the antenna and the radio device,
   wherein the channel state predicting flag has at least three different values to indicate a state of the characteristic of the data transmission signal.

18. The RFID tag of claim 17, further comprising a memory unit to store data,
   wherein the radio communication unit determines an address of data in the memory unit to transmit to the radio unit via the antenna.

19. The RFID tag of claim 17, wherein
   the radio communication unit determines whether to change the packet size of data transmitted to the antenna based on the state of the channel state predicting flag,
   wherein the channel state predicting flag is a 2-bit counter.

* * * * *